M. H. FLETCHER.
Garden Hoe.
No. 83,771.                            Patented Nov. 3, 1868.
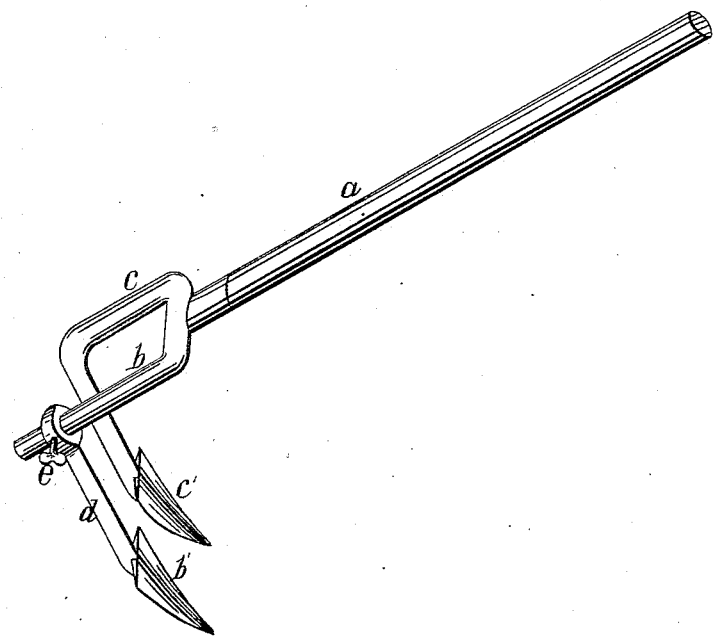
WITNESSES:
A. Robert
W. P. Estell
INVENTOR:
Mordecai H. Fletcher
By Joseph Ridger
his atty.

MORDECAI H. FLETCHER, OF RICHMOND, INDIANA.

Letters Patent No. 83,771, dated November 3, 1868.

IMPROVEMENT IN COMPOUND ADJUSTABLE GARDEN-HOE.

The Schedule referred to in these Letters Patent and making part of the same.

*To all whom it may concern:*

Be it known that I, MORDECAI H. FLETCHER, of the city of Richmond, and State of Indiana, have invented a new and useful Improvement in Garden-Implements; and I do hereby declare that the following is a full and exact description thereof, reference being had to the accompanying drawing, making a part of this specification.

My invention relates to a hand-implement for gardening-purposes, constructed with two shovels that may be drawn between rows, in the manner of a double-shovel plow, or may be used as an ordinary hoe.

To enable others skilled in the art to make and use my said invention, I will proceed to describe its construction.

The bifurcation $b\ c$ is provided with a shank, on which handle $a$ is secured. The arm $c$ is a single rod, forming an angle by which the end of said arm terminates in a position suitable to hold shovel $c'$.

The end of shank $d$, to which shovel $b'$ is attached, is received on the arm $b$ by means of an eye in said shank, thus allowing shovel $b'$ to be adjusted forward or backward to any desired position with relation to shovel $c$. Shovel $b'$ may also be adjusted laterally, to increase or diminish the distance between the two shovels; or the positions of the shovels may be reversed, so that one only may be used for furrowing or other purposes for which a single shovel only is needed. A thumb-screw, $e$, serves to tighten the shank $d$ on arm $b$, and thus hold shovel $b'$ in any desired position.

Having thus fully described my said invention,

What I claim, and desire to secure by Letters Patent, is—

The combination of the arms $b$ and $c$, shovels $b'$ and $c'$, and shank $d$, when the latter is made adjustable on arm $b$, and the whole is constructed in the manner described, and for the purpose set forth.

MORDECAI H. FLETCHER.

Witnesses:
   JOSEPH RIDGE,
   A. ROBERTS.